United States Patent [19]

Long

[11] 4,135,752
[45] Jan. 23, 1979

[54] GROUND PLUGGING DEVICE

[76] Inventor: William J. Long, 401 Sterling, Duenweg, Mo. 64841

[21] Appl. No.: 860,755

[22] Filed: Dec. 15, 1977

[51] Int. Cl.² .............................................. A01B 1/16
[52] U.S. Cl. .................................................. 294/50.7
[58] Field of Search .................... 294/50.7, 50.5, 50.8, 294/50.6, 50.9, 61, 19 R, 50; 172/19, 21, 22; 220/95

[56] References Cited

U.S. PATENT DOCUMENTS

| 310,592 | 1/1885 | Johnson | 294/50.7 |
|---|---|---|---|
| 1,004,683 | 10/1911 | Pritchard | 220/95 |
| 2,599,087 | 6/1952 | Benison | 294/50.7 |
| 3,079,190 | 2/1963 | Hansen | 294/50.7 |
| 3,386,762 | 6/1968 | Mendonca | 294/50.7 |

Primary Examiner—James B. Marbert
Attorney, Agent, or Firm—Lowe, Kokjer, Kircher, Wharton & Bowman

[57] ABSTRACT

A lightweight, portable device for use in removing plugs of earth from the ground and particularly useful in connection with metal detecting. A hollow cylindrical body open at the top and bottom has sharpened teeth on its lower edge and a blunt upper edge against which the foot may be pressed to drive the body into the ground. A bail is pivotally attached to the body to facilitate its raising from the ground with simultaneous twisting. The bail may be pivoted to a lowered or retracted position wherein it is below the blunt upper edge of the body in order to completely expose the same for receipt of the foot.

1 Claim, 3 Drawing Figures

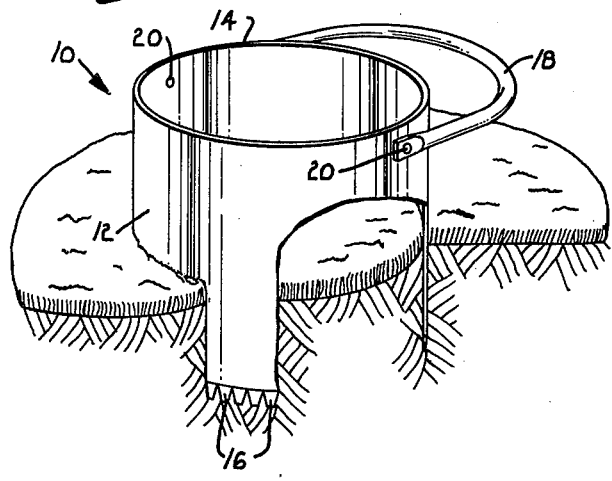
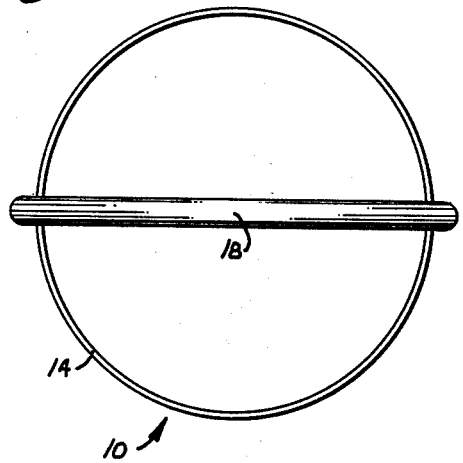
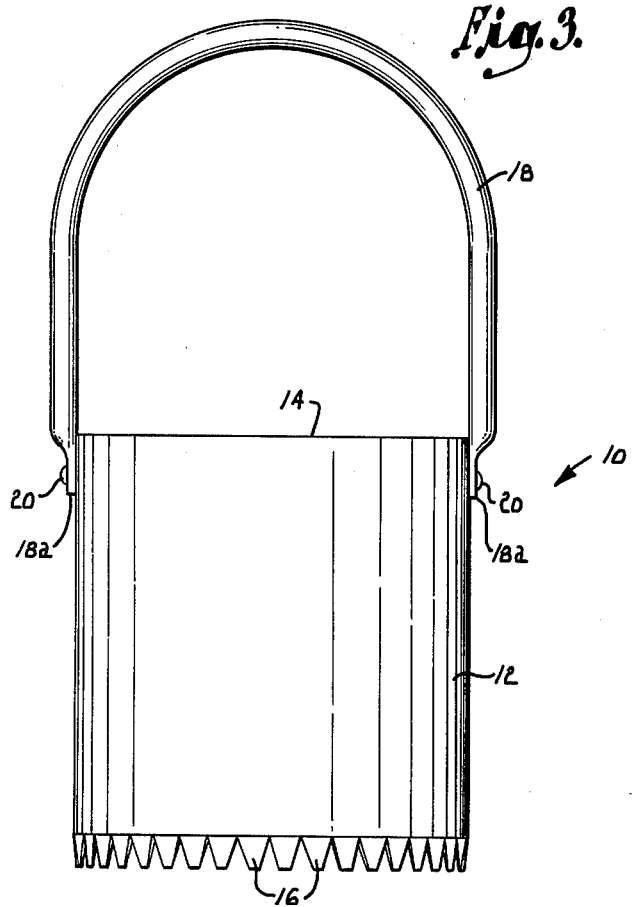

GROUND PLUGGING DEVICE

BACKGROUND AND SUMMARY OF THE INVENTION

This invention relates in general to ground plugging and deals more particularly with an improved device that may be used to remove plugs of earth from the ground.

With increased popularity of coin hunting and metal detecting in recent years has come an increased demand for a quick and easy means for removing buried coins, rings, various types of artifacts, and other metal objects from the ground. It is not uncommon at present for crude digging instruments to be employed to dig up metal objects that have been located by a metal detecting machine. Manifestly, this type of digging can severely harm the ground in the area at which the digging occurs, often resulting in unsightly damage to fields and other regions.

Although various types of devices have been proposed for removing plugs of ground, such devices have been developed primarily for applications such as relocating the holes on golf course greens or repairing damaged areas of lawns and the like. Therefore, equipment of this type is not well suited for use in connection with metal detecting activity. In particular, the devices presently available are too large, bulky, heavy, and unwieldy to carry from place to place as is necessary in metal detecting, which requires extensive walking. This lack of portability is particularly evident when it is recognized that a metal detecting machine which must also be carried typically requires both hands to operate effectively.

Existing devices which are capable of plugging the ground are further characterized by undue cost and complexity and are difficult and time consuming to use. Moreover, plugs of only a predetermined size or depth are able to be removed from the ground, and access to metal objects located near the center of the plug could be gained only by breaking up the plug so substantially that it could not be replaced in order to restore the ground to its original condition. In some instances, most notably when encountering hard ground or ground containing rocks, ruts and the like, it is impossible or at best takes considerable effort to drive existing devices into the ground.

It is the principal object of the present invention to provide an improved ground plugging device which is small and light in weight in order to be easily carried, and which may be used quickly and easily to remove plugs of earth from the ground. The portability of the device makes it particularly useful in connection with metal detecting and similar activity.

Another object of the invention is to provide a device of the character described which avoids excessively damaging the plugs of ground, thus facilitating restoration of the ground to its original undamaged condition. After removal of the metal object, the plug may be easily replaced in its hole such that there is virtually no trace that plugging of the ground has been carried out.

A further object of the invention is to provide a device of the character described that may be driven into the ground to virtually any desired depth in order to reach objects buried at various distances below the surface.

Yet another object of the invention is to provide a device of the character described which may be easily driven into each hard ground with the foot, and which includes a bail that facilitates twisting of the device during penetration and/or removal.

An additional object of the invention is to provide a device of the character described that may be used to transfer plugs of sod between various locations, as well as in other types of ground plugging operations.

A still further object of the invention is to provide a device of the character described which is simple and economical to construct, which is structurally strong and resistant to rust and other damage, and which may be clipped or hooked to the belt in order to free both hands for operation of a metal detecting machine or for another purpose.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a perspective view showing the ground plugging device of the present invention inserted into the ground, with a portion broken away for purposes of illustration and with the bail swung to its lowered position;

FIG. 2 is a top plan view of the ground plugging device shown in FIG. 1, with the bail in its raised position; and FIG. 3 is a side elevation view of the ground plugging device, with the bail in the raised position.

Referring now to the drawing in more detail, a ground plugging device constructed in accordance with a preferred embodiment of the present invention is generally designated by reference numeral 10. The device 10 includes a hollow cylindrical body 12 which is constructed of stainless steel or another hard metal substance. The body 12 is open at its upper and lower ends and presents a hollow interior region for receiving plugs of ground.

As best shown in FIG. 2, body 12 presents a circular upper edge 14 which is a relatively blunt edge against which the foot may be pressed in order to drive the body downwardly into the ground. The lower end of body 12 is likewise open, and its circular lower edge is provided with a series of spaced apart teeth 16 which present sharp cutting members for penetration of the ground. As best shown in FIG. 3, teeth 16 taper from top to bottom and are sharpened on their lower cutting edges such that they are able to penetrate even hard ground. The teeth are made of stainless steel or another hard metal.

A bail 18, which in the preferred embodiment is stainless steel tubing approximately ¼ inch in diameter, is pivotally secured to body 12. The bail is a generally curved member of substantially semicircular shape, and its opposite ends are flattened as indicated at 18a in FIG. 3. A pair of stainless steel rivets 20 are used to pivotally secure the flattened ends 18a against the exterior surface of body 12 on opposite sides thereof. Rivets 20 are located slightly below the blunt upper edge 14, and they provide a common pivot axis for the flattened ends 18a about which bail 18 may be swung upwardly and downwardly. The pivotal mounting of bail 18 permits it to be moved between the lowered position shown in FIG. 1 and the raised position shown in FIGS. 2 and 3.

The primary use of device 10 is in conjunction with metal detecting in order to recover coins, rings, artifacts, and various other types of metal objects which have been located by a metal detecting machine. After the metal detector has located a buried metal object, the teeth 16 are placed on the ground with the object approximately centered with respect to body 12. With bail 18 preferably pivoted to the lowered position shown in FIG. 1, wherein the entirety of the bail is below the upper edge 14, the foot is applied to the exposed upper edge of body 12 and pressed downwardly in order to drive the body into the ground to the desired depth.

After the body has penetrated to the desired depth, bail 18 is pivoted upwardly to the raised position shown in FIG. 3 and is pulled straight upwardly, preferably with a simultaneous twisting motion, in order to withdraw the body from the ground. Friction between the interior walls of body 12 and the plug of ground retains the plug within the device as it is removed from the ground. After the device has been raised from the ground, the plug is removed by holding bail 18 in one hand and pushing downwardly against the top of the plug through the opened upper end of body 12. The plug is thus pushed out through the opened bottom of the device and may be searched to locate and remove the metal object contained therewithin. Since the plug is not significantly damaged in most cases, it may simply be replaced in its hole and pressed down upon lightly with the foot in order to restore the ground to its original undamaged condition.

It is thus apparent that a number of plugs may be neatly and quickly removed and searched for metal objects without resulting in significant damage to the areas at which the digging is carried out. Since the device is light in weight, it is highly portable and may be easily carried by means of the bail 18. In addition, device 10 may be carried by clipping or hooking its bail 18 to a small clip or hook (not shown) attached to the belt of the user near the back pocket, thus freeing both hands for operation of a metal detecting machine or for another purpose.

It is noted that bail 18 may be pivoted downwardly below the upper edge of body 12 such that edge 14 is exposed to the foot when the device is to be driven into the ground. In some instances, as when hard ground is encountered, it may be desirable to twist body 12 slightly in order to enhance the cutting action of teeth 16 and passage of the device through the hard ground. In this respect, bail 18 is large enough that it may be raised slightly or fully above the foot such that it provides a hand grip by which twisting of the body may be accomplished. However, in most cases, the device may be easily pushed into the ground by the foot with relatively little effort. It is noted additionally that bail 18 provides a convenient means by which the device may be twisted as it is being raised from the ground in order to facilitate its removal. Since the device is constructed entirely of stainless steel or the like, it is strong enough to withstand considerable stress, it will not rust, and it requires little maintenance and repair work.

Although device 10 finds particular utility in connection with metal detecting, it should be evident that it is equally useful for transferring plugs of sod or ground from one location to another. By way of example, body 12 is typically about 4 inches in diameter and approximately 4¼ inches in height when constructed for use in metal detecting. Bail 18 is typically 12 inches long.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A portable, hand carried device for removing a plug of earth from the ground, said device comprising in combination:

a tubular metal body open at the bottom and top and including a continuous integrally formed wall having a cylindrical shape and a constant diameter, said wall terminating in a circular bottom edge and presenting a hollow interior region of constant volume for receiving the plug in direct contact with the inside surface of said wall, said wall being short enough to permit the foot to be applied to its top with said bottom edge resting on the ground surface;

a plurality of spaced apart teeth on said bottom edge, said teeth tapering from top to bottom and terminating in sharp lower cutting edges for cutting through the ground when said body is driven into the ground;

a relatively blunt edge on the top of said body adapted to receive the foot to assist in driving said body into the ground; and a bail formed of hollow metal tubing and curving in a gradual and substantially uniform manner between opposite ends of the bail, said opposite ends being fixedly pivoted to said body to couple said bail therewith for pivotal movement between a raised position wherein the bail may be manually grasped and twisted as the foot is pressed downwardly on said blunt edge to effect cutting of said teeth through the ground, and a lowered position wherein said bail is located substantially below said blunt edge.

* * * * *